United States Patent

Falconi

[11] 3,889,975
[45] June 17, 1975

[54] FRAME FOR BICYCLES, MOTOR BICYCLES AND THE LIKE

[76] Inventor: Lodovico Falconi, Via Ca Pisani, 13, Padova, Italy

[22] Filed: Mar. 28, 1974

[21] Appl. No.: 455,552

[30] Foreign Application Priority Data
Oct. 18, 1973 Italy .................. 41667/73

[52] U.S. Cl. .............................. 280/281
[51] Int. Cl. .............................. B62k 11/02
[58] Field of Search .................. 280/281

[56] References Cited
UNITED STATES PATENTS

| 634,089 | 10/1899 | Libbey | 280/281 |
| 714,571 | 11/1902 | Freed | 280/281 |
| 2,153,249 | 4/1939 | Henry | 280/281 |

FOREIGN PATENTS OR APPLICATIONS

| 617,311 | 11/1926 | France | 280/281 |
| 79,371 | 8/1950 | Czechoslovakia | 280/281 |

*Primary Examiner*—Leo Friaglia
*Attorney, Agent, or Firm*—Newton, Hopkins & Ormsby

[57] ABSTRACT

A frame for bicycles, motor bicycles and the like comprising tubular elements interconnected by angle elements; each end of a tubular element is screw threaded into a connecting angle element, and a strengthening element is provided with a shank screwed in corresponding end of said tubular element.

9 Claims, 8 Drawing Figures

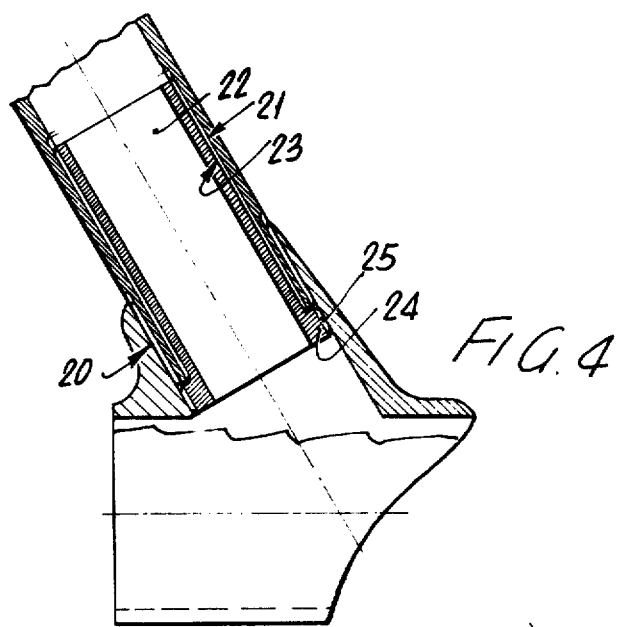
FIG. 4
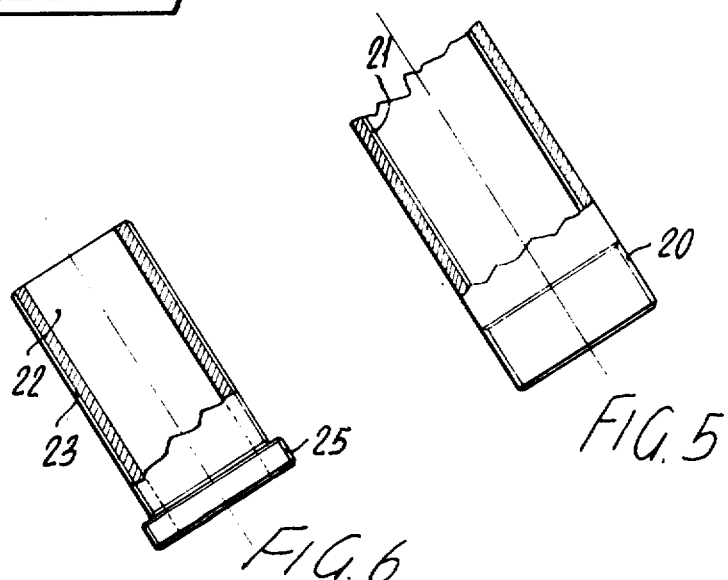
FIG. 5
FIG. 6

FRAME FOR BICYCLES, MOTOR BICYCLES AND THE LIKE

Generally, this invention relates to improvements in bicycles, motor bicycles and the like, and more particularly is concerned with improvements in the production of frames for bicycles and motor bicycles which, in addition to being more advantageous, will enable the construction of bicycles and the like of an extremely light weight, while meeting the necessary requirements of sturdiness and strength.

It is well known that a frame in standard bicycles or motor bicycles or motor cycles is comprised of a single integral structure formed of suitably dimensioned tubular elements which are welded to suitably shaped angle connections.

This universally used method involves a high production cost as making it necessary to effect many expensive and time consuming weldings. Moreover, the frames must be necessarily assembled at factory location, being the bicycle sold at a most completely assembled condition.

It is the object of the present invention to provide a bicycle frame entirely comprising tubular elements dismantably joined to suitable angle connections.

More particularly, it is an object of the present invention to provide a frame for bicycles, motor bicycles and the like, wherein the several parts of the frame, that is the tubular elements and angle connections comprising it, can be assembled and fixedly attached to one another by making use of threads, without having to use any weldings, the use of a special split angle connection allowing to close the frame polygon without the elements being subjected to stresses and deformations.

It is a further object of the invention to provide a frame of the above mentioned design such that, on providing frames of a different length, it will readily enable to manufacture frames of different shape and/or size, thus fully accomodating the various sizes.

According to the invention, even not weldable very light special materials can be used for the frame.

In practical operation, it has been found that the threaded junction between the angle connections and tubular elements is a zone of minor mechanical strength. Accordingly, particularly in case of racing bicycles, or bicycles handled by persons provided with uncommon muscular strength, in some cases the frame could accordingly break.

According to the invention, it was devised to strengthen the junction between a threaded end of a tubular element and relative connection, but without imparing the dismantling capability of the frame.

According to the invention, in a frame for bicycles, motor bicycles and the like, comprising a front wheel carried by a fork pivoted to said frame and connected to a handle bar to operate as a steering member, and a rear drive wheel carried by a second fork fixedly attached to said frame, the frame comprises tubular elements interconnected by connecting angle elements, each end of said tubular elements having an external thread and an internal thread, and a cylindrical strengthening element having a shank and an end portion of a greater diameter, which are externally threaded, said shank of the strengthening element screw threading in one end of a tubular element, the external thread of the greater diameter portion of said strengthening element forming a continuation of the external thread at the end of said tubular element.

A not limiting exemplary embodiment of a bicycle frame according to the invention will now be described with reference to the accompanying drawings in which:

FIG. 4 is a longitudinal sectional view showing an angle connection with a tubular element and a strengthening element screw threaded therein;

FIG. 5 is a fragmentary partly sectional view showing a threaded end of a tubular element;

FIG. 6 is a partly sectional view showing a strengthening element; and

Figure 1:
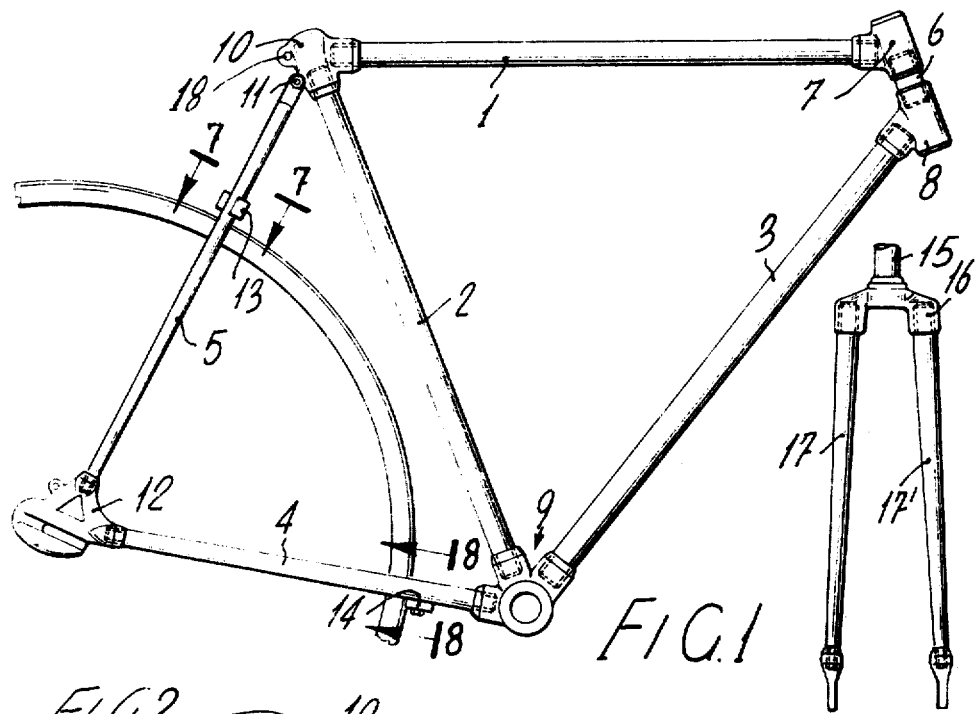
FIG. 1 shows a general bicycle frame according to the invention.
Figure 7:
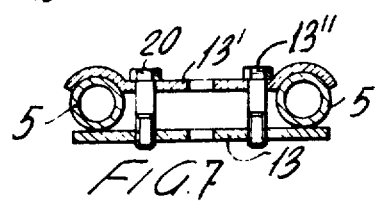
Figure 8:
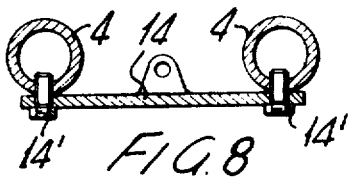

FIGS. 7 and 8 are sectional views taken along lines 7—7 and 8—8, respectively, of FIG. 1.

In the Figures of the accompanying drawings a bicycle frame has been schematically shown, omitting for the sake of drawing simplicity further details per se known and not essential for understanding the invention, such as the wheels, the drive system to the rear control wheel and the bicycle handle bar.

As shown in the drawings, the frame shown therein comprises the tubular elements 1, 2, 3, 4, 5 and 6, and the angle connections 7, 8, 9, 10 and 12.

In the case, the tubular element 6 and connections 7 and 8 may form a single unit.

Figure 2:
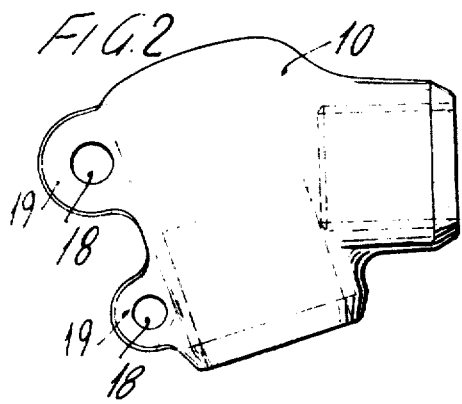
FIG. 2 is a side view of the top connection relating to the saddle.
Figure 3:
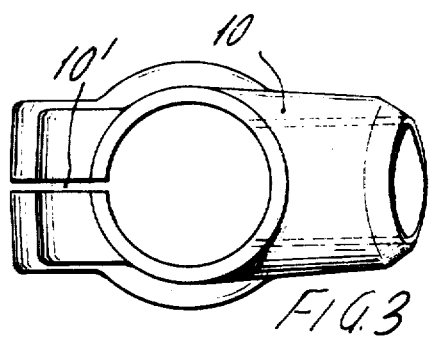
FIG. 3 is a bottom view of the connection shown in FIG. 2.

More particularly, according to a preferred embodiment of the invention, the tubular elements 1, 2, 3 and 6 of the frame have the ends thereof externally threaded in order to be screw threaded and fixedly connected in the internally threaded tubular arms of the associated angle connections 7, 8, 9 and 10. The connection 10 located beneath the saddle is split, having a longitudinal split 10' on the rear side, as shown in FIGS. 2 and 3, so that the hole for the tubular element 2 will initially be of a larger size than said tubular element to enable the latter to be merely slipped into the connection 10. This connection 10 can be then clamped by means of lock screws 11 passing through corresponding holes 18 (FIG. 2) suitably provided on tabs 19 of the connection element 10 at the split 10' thereof. Thereby, the frame can be completed, after the tubular elements 1, 3, 6 and 2 have been screw threaded to the connections 10 and 7, 8 and 9, 7 and 8, respectively, and only to the connection 9 for the tubular element 2, without it being required to use right screw and left screw threads for each of the tubular elements, and without deforming or stressing said tubular elements.

Correspondingly, the tubular elements 4, forming with the tubular elements 5 the rear fork, are screw threaded to the lower connection 9, forming the box for the bicycle pedal movement, and respectively to the support element 12 for the rear wheel (not shown). Similarly, each of the tubular elements 5 are screw threaded at one end to the associated support element 12 for the rear wheel, and at the other end being locked to the above mentioned top angle connection 10 by means of a screw 11 passing through the hole 18.

The fork for the steering front wheel, as separated from the frame, is shown in FIG. 1.

The fork for the front wheel (which is not shown in the drawing) comprises a cross element 16, thereto being screw threaded the fastening tubular elements 17 and 17' for the front wheel and the top tubular element 15 to which, when assembling, the bicycle handle bar is secured after passing through the tubular element 6.

As previously mentioned, the threaded junction between the tubular elements and angle connections provides a zone of a lower mechanical strength; therefore, it is provided according to the invention to strengthen the tubular elements at each end thereof by inserting a cylindrical strengthening element for a certain length thereof.

A particular embodiment of the invention is shown in FIGS. 4 to 6, relating to the junction between the lower connection 9 (only partly shown) and the tubular element 2 forming the pillar post.

As shown in the drawings, the tubular element 2 has at its end a first external thread 20 screw threading in a corresponding internal thread of the angle connection 9. The tubular element 2 has also a second internal thread 21 extending for a greater length than said external thread 20. Independently, the two threads may have a same pitch or different pitches.

Internally of the threaded end of each of the tubular elements of the frame, a cylindrical strengthening element is screw threaded inserted which, in the example shown, comprises a sleeve having a shank 22 provided with an external thread 23 coupling with the internal thread 21 at the end of the tubular element 2 of the frame.

At its outer end, said externally threaded shank 22 has a portion or head 24 of a larger diameter than that of said shank and the same as the outer diameter of the threaded end of the tubular element 2. In turn, this head of the inner strengthening element 22 has an external thread 23 screw threading in the internal thread of said angle connection, so that care should of course be taken that the thread 25 on the head of the strengthening element would form a continuation of the external thread 20 at the end of the tubular element.

The assembling of the frame occurs as follows: the shank 22 of each of the strengthening elements are internally screw threaded to one end of the associated tubular element, until contacting the threaded head 24 with the end of said tubular element, then the assembly of each tubular element can be screw threaded with the internal strengthening sleeves in the corresponding angle reinforcements; more particularly, the connections 7 and 8 are joined to the tubular element 6, then subsequently connecting the elements 1 and 3 and then the connections 9 and 10.

The frame is assembled as follows.

The size of the hole in the connection 10, in which hole the tubular element 2 is inserted, is of a larger size than said element 2, which connection 10 can be tightened by the lock screws 11, as above mentioned.

Then, the tubular element 2 is slipped within the connection 10 and is screw threaded at the bottom to the connection 9.

The tubular elements 4 (two by two in a pair) are also joined on this connection, these tubular elements 4 pertaining to the rear fork.

The tubular elements 4 can carry, as previously paired, the wheel supports 12, or such supports can be later applied.

Finally the tubular elements 5, also in number of two, are applied, thus completing the rear fork attached to the frame.

The tigthening of screws 11 clamps the frame elements.

Now, the mud-guard supporting clips or brackets 13, 13' and 14 are assembled, and the frame is completed by applying the steering front wheel.

More particularly, the top clip or bracket comprises a pair of opposite plates 13, 13' connected by lock screws 13'', so that the tubular elements 5 are clamped between said plates 13, 13'. Otherwise, the bottom clip or bracket comprises a single plate 14 directly secured to the tubular elements 4 by screws 14'.

It will be apparent from the foregoing that the threaded junction is thereby strengthened, the higher strength depending on the thickness of the inner strengthening element for each of the tubular elements of the frame and on the length of said threaded strengthening elements.

What is claimed is:

1. A frame for bicycles, motor bicycles and the like to which a fork for a front wheel connected to a handle bar as a steering member may be pivoted, and to which a fork for a rear wheel may be made fast, said frame comprising a plurality of angle connecting elements having internal screw threads; a plurality of tubular elements having internal screw threads at each end thereof and having external screw threads at each end thereof threaded in said angle connecting elements internal screw threads in interconnecting the plurality of tubular elements together; and a plurality of inner strengthening elements screw threaded in said plurality of tubular elements internal screw threads.

2. A frame as set forth in claim 1, wherein the inner strengthening element is of a greater length than the externally threaded section of an end of each of said tubular elements.

3. A frame as set forth in claim 1, wherein said inner strengthening element has an externally threaded shank internally screw threadable to an end of one of said tubular elements, and an externally threaded end portion of a major diameter corresponding to the outer diameter of said tubular element. .

4. A frame as set forth in claim 1, wherein the external thread of the major diameter end portion of the inner strengthening element forms a continuation of the external thread to one end of a tubular element of the frame.

5. A bicycle frame as set forth in claim 1, wherein the tubular frame element connected between the top angle connection underlying the saddle and the bottom angle connection of the pedal is capable of being slipped into said top angle connection, the latter having a longitudinal split along at least a portion of said connection and lock screws to enable for locking said tubular element by tightening said screws in said connection.

6. A bicycle frame as set forth in claim 5, wherein one of said lock screws of said top connection is also effective in assembling the vertical tubular elements forming the rear fork.

7. A bicycle frame as set forth in claim 1 comprising bracket means secured with lock screws to one of said tubular elements for attaching a mud-guard to the rear fork.

8. A bicycle frame as set forth in claim 7 wherein said bracket means comprises a pair of opposing plates connected by said lock screws, and wherein said bracket means is secured to vertical sheaths of the rear fork with said pair of opposing plates clamped thereabout.

9. A bicycle frame as set forth in claim 8, wherein the bracket means for attaching the mud-guard to the horizontal sheaths of the rear fork comprises a plate attached by means of screws to said horizontal sheaths.

* * * * *